US012694372B2

(12) United States Patent
Sinha Banerjee et al.

(10) Patent No.: US 12,694,372 B2
(45) Date of Patent: Jul. 28, 2026

(54) METHOD AND SYSTEM FOR PREDICTION OF PROFICIENCY OF PERSON IN SKILLS FROM RESUME

(71) Applicant: Tata Consultancy Services Limited, Mumbai (IN)

(72) Inventors: Anindita Sinha Banerjee, Pune (IN); Sachin Sharad Pawar, Pune (IN); Girish Keshav Palshikar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 753 days.

(21) Appl. No.: 18/049,527

(22) Filed: Oct. 25, 2022

(65) Prior Publication Data

US 2023/0196296 A1 Jun. 22, 2023

(30) Foreign Application Priority Data

Dec. 16, 2021 (IN) ............................. 202121058789

(51) Int. Cl.
*G06Q 10/1053* (2023.01)
*G06N 5/022* (2023.01)

(52) U.S. Cl.
CPC ......... *G06Q 10/1053* (2013.01); *G06N 5/022* (2013.01)

(58) Field of Classification Search
CPC .. G06Q 10/10; G06Q 10/1053; G06Q 10/105; G06N 5/022

(Continued)

(56) References Cited

U.S. PATENT DOCUMENTS 11,017,355 B2 5/2021 Rennison et al.
12,242,988 B2 * 3/2025 Datta .................... G06F 40/216
(Continued)

FOREIGN PATENT DOCUMENTS

AU 2020204202 A1 7/2020

OTHER PUBLICATIONS

Vyhmeister et al., "Deep Neural Network for Constraint Acquisition Through Tailored Loss Function", 2024, Computational Science— ICCS 2024. ICCS 2024. Lecture Notes (Year: 2024).*

(Continued)

*Primary Examiner* — Jessica Lemieux
*Assistant Examiner* — Joshua D Schneider
(74) *Attorney, Agent, or Firm* — Finnegan, Henderson, Farabow, Garrett & Dunner, LLP

(57) ABSTRACT

This disclosure relates generally to predicting proficiency level of a person from resume. The proficiency levels obtained using state-of-the-art methods tends to overestimate proficiency. Moreover, the estimated proficiency levels do not satisfy several constraints that are considered key by subject matter experts. Embodiments of the present disclosure extract skills and other related information automatically from resume and capture skill related information in terms of a feature vector. A skill estimation function is learned to predict the proficiency level of the skill from the feature vector using any one of two models. A first model is learned using a constraint loss function to combine label information with domain specific constraints and a second model is learned using a clustering based technique. The disclosure predicts skill proficiency using only resume and can be used for predicting proficiency level of skills of employees from their resumes, for suitable job recommendations from job portal.

11 Claims, 3 Drawing Sheets

(58) Field of Classification Search
USPC .......................................................... 705/321
See application file for complete search history.

(56) References Cited

U.S. PATENT DOCUMENTS

| 2016/0196534 A1* | 7/2016 | Jarrett | ................ | G06Q 50/2057 |
| | | | | 705/321 |
| 2020/0126022 A1* | 4/2020 | Gaspar | ............... | G06Q 10/1053 |
| 2022/0129856 A1* | 4/2022 | Zhang | ................ | G06Q 10/1053 |
| 2022/0327487 A1* | 10/2022 | Vontobel | ................ | G06N 3/045 |

OTHER PUBLICATIONS

Ankala, Krishna Mohan et al., "Resume Analysis for Skill-Set Estimation using HDFS,MapReduce and R", World Congress on Engineering and Computer Science Date: Oct. 2016, Publisher: Semantic Scholar, http://www.iaeng.org/publication/WCECS2016/WCECS2016_pp480-485.pdf.
Vukadin, Davor et al., "Information Extraction From Free-Form CV Documents in Multiple Languages", IEEE Access, Date: Jun. 2021, pp. 5069-5087, https://www.researchgate.net/publication/352275005_Information_Extraction_From_Free-Form_CV_Documents_in_Multiple_Languages/link/60c1758c299bf1949f447d7b/download.

* cited by examiner

METHOD AND SYSTEM FOR PREDICTION OF PROFICIENCY OF PERSON IN SKILLS FROM RESUME

PRIORITY CLAIM

This U.S. patent application claims priority under 35 U.S.C. § 119 to: Indian Patent Application No. 202121058789, filed on 16 Dec. 2021. The entire contents of the aforementioned application are incorporated herein by reference.

TECHNICAL FIELD

The disclosure herein generally relates to the field of information extraction, and, more particularly, to a method and system for prediction of proficiency of person in skills from resume.

BACKGROUND

In many practical situations, there is a need to quickly and accurately assess the proficiency level of a person in a particular skill. For example, just before an interview, interviewers often identify a few major skills of a candidate from his/her resume and informally (and subjectively) assess his/her proficiency level in each of the skills. The assessment is done usually using mental markers like beginner, intermediate, expert. An internal employees-to-projects assignment system would benefit by having an automated skill-wise proficiency assessment system from employees' resumes. A job portal may want to automatically assign proficiency levels to various skills for millions of resumes in their repository for suitable job recommendations.

Proficiency level of a person in the particular skill is a numerical score that measures the extent of knowledge, understanding, experience, and ability to apply the skill to solve a practical problem. A skill is defined as a broad technical subject or area of knowledge; for example: Relational Database management, Java, Machine Learning and so on. The subjective assessments of proficiency level in a skill are opaque (not easily explainable), error-prone, and vary from person to person.

There are few prior methods available for extracting skills from textual document. In one such prior method, extraction of skills mentioned in candidate profiles like resumes, using several skill ontologies is proposed. The extracted skills are further used to create a personalized skill graph which is used for career path recommendations. Another prior method proposes an approach to extract skills from resumes including inferring implicit skills which are not explicitly mentioned. However, both prior methods do not address the problem of estimating proficiencies of the extracted skills.

Further there are prior methods for estimating skill proficiency of a person using Item Response Theory (IRT), knowledge tracing and deep knowledge tracing. However, these methods rely on interactions with students. There are prior methods available to estimate skill proficiency levels using Elo rating system. In one prior method for estimating skill proficiency level an ordinal regression clustering approach is used to classify employees into five different proficiency levels as per their expertise in a broad subject area. In yet another prior method a ranking-based learning for scoring functions where the model is trained from pairwise comparisons is described for estimating skill proficiency levels. However, in these prior methods, proficiency levels obtained tend to overestimate proficiency.

SUMMARY

Embodiments of the present disclosure present technological improvements as solutions to one or more of the above-mentioned technical problems recognized by the inventors in conventional systems.

For example, in one embodiment, a method for prediction of proficiency of person in skills from resume is provided. The method includes: receiving a resume of a person, wherein the resume of the person comprises a set of activities, wherein the set of activities are associated with one or more skills; extracting a set of information corresponding to the one or more skills associated with an activity from amongst the set of activities from the resume using an information extraction tool, wherein the set of information comprises a set of skill markers mapped to the one or more skills associated with the activity; generating from the set of information, a feature vector corresponding to each of the skill associated with the activity and predicting a proficiency level for each of the skill of the person in terms of a proficiency score wherein the proficiency score is calculated by providing the feature vector to one of (i) a pre-trained first model or (ii) a pre-trained second model (208), wherein training the first model for the skill comprising, receiving a set of training data for training the first model wherein the set of training data comprises a set of labelled pair of resumes, wherein each labelled pair of resumes of the set of labelled pair of resumes is associated with a relative proficiency level of the skill; extracting a list of information from the set of labelled pair of resumes using the information extraction tool; generating a list of feature vectors corresponding to the skill from the list of information and learning a proficiency estimation function to calculate the proficiency score of the skill, wherein the learning of the proficiency estimation function is performed using (i) a constraint loss function and (ii) a margin loss function, wherein the constraint loss function is computed using a set of constraints and wherein the set of constraints are empirically defined.

In another aspect, a system for prediction of proficiency of person in skills from resume is provided. The system comprises memory storing instructions; one or more communication interfaces; and one or more hardware processors coupled to the memory via the one or more communication interfaces, wherein the one or more hardware processors are configured by the instructions to receive a resume of a person, wherein the resume of the person comprises a set of activities, wherein the set of activities are associated with one or more skills; extract a set of information corresponding to the one or more skills associated with an activity from amongst the set of activities from the resume using an information extraction tool, wherein the set of information comprises a set of skill markers mapped to the one or more skills associated with the activity; generate from the set of information, a feature vector corresponding to each of the skill associated with the activity and predict a proficiency level for each of the skill of the person in terms of a proficiency score wherein the proficiency score is calculated by providing the feature vector to one of (i) a pre-trained first model or (ii) a pre-trained second model (208), wherein training the first model for the skill comprises, receive a set of training data for training the first model wherein the set of training data comprises a set of labelled pair of resumes, wherein each labelled pair of resumes of the set of labelled pair of resumes is associated with a relative proficiency level of the skill; extract a list of information from the set of labelled pair of resumes using the information extraction tool; generate a list of feature vectors corresponding to the skill from the list of information and learn a proficiency estimation function to calculate the proficiency score of the skill, wherein the learning of the proficiency estimation function is performed using (i) a constraint loss function and (ii) a margin loss function, wherein the constraint loss function is computed using a set of constraints and wherein the set of constraints are empirically defined.

In an embodiment, wherein the constraint loss function is represented as $$loss_{cons} = (\max(0, f(x) - UB(x)) + \max(0, f(y) - UB(y)))/2$$

where x and y are resumes and $\langle x, y \rangle$ is any labelled pair of resumes from the set of labelled pair of resumes, UB(x) and UB(y) are the maximum allowable proficiency level for the skill for the x and y resumes respectively, f(x) and f(y) are the proficiency level for the skill associated with the x and y resumes respectively.

In an embodiment, wherein the margin loss function is represented as $$loss_1 = \max(0, 1 - (f(x) - f(y)))$$
$$loss_2 = \max(0, |f(x) - f(y)| - 1)$$
$$loss_{margin} = loss_1 + loss_2$$

where x and y are resumes $\langle x, y \rangle$ is any labelled pair of resumes from the set of labelled pair of resumes.

In an embodiment, wherein the feature vector is represented as a set of features corresponding to the skill, wherein the set of features corresponding to the skill includes (1) a total duration of the skill corresponding to an activity ($x_1$), (2) number of activities corresponding to the skill ($x_2$), (3) number of activities corresponding to the skill ($x_3$), (4) number of distinct roles of the skill corresponding to the activity ($x_4$), (5) number of distinct skill markers mentioned in the activity corresponding to the skill ($x_5$), (6) ratio of ($x_4$) to total number of skill markers (whether or not corresponding to the skill) mentioned in the activity corresponding to the skill ($x_6$), (7) number of distinct certifications or courses corresponding to the skill ($x_7$), (8) number of distinct skill markers corresponding to the skill mentioned anywhere in the resume ($x_8$).

In an embodiment, wherein training the second model for the skill comprising, receiving a first plurality of resumes for training the second model wherein each resume of the first plurality of resumes is associated with a proficiency level of the skill; clustering the first plurality of resumes to obtain a set of clusters, wherein each cluster of the set of clusters is represented with a feature vector corresponding to (i) a cluster center and (ii) a cluster representative resume; and annotating a proficiency score of the skill to each cluster in the set of clusters based on (i) the cluster center and (ii) the cluster representative resume.

In an embodiment, wherein predicting the proficiency level of the skill of the person using the pre-trained second model comprising, finding a cluster corresponding to the resume of the person based on the feature vector of the resume of the person, wherein the cluster center of the cluster corresponding to the resume of the person is the nearest cluster center; and assigning the proficiency score annotated to the cluster corresponding to the resume of the person as the proficiency score of the skill of the person.

In an embodiment, wherein the mapping of each skill marker to the skill comprising, receiving a list of skill markers corresponding to the skill; identifying a list of concepts connected to the list of skill markers in an ontology through relations indicating generalization; identifying from the list of concepts, a list of relevant concepts by discarding a list of irrelevant concepts; and generating a first list of skill markers connected to the list of relevant concepts in the ontology through relations indicating specialization.

In an embodiment, updating the first list of skill markers further comprises receiving a second plurality of resumes; identifying a second list of skill markers from the second plurality of resumes, wherein the second list of skill markers are co-located with the first list of skill markers in the second plurality of resumes; and updating the first list of skill markers by adding the second list of skill markers to the first list of skill markers.

In yet another aspect, a non-transitory computer readable medium for prediction of proficiency of person in skills from resume is provided by receiving a resume of a person, wherein the resume of the person comprises a set of activities, wherein the set of activities are associated with one or more skills; extracting a set of information corresponding to the one or more skills associated with an activity from amongst the set of activities from the resume using an information extraction tool, wherein the set of information comprises a set of skill markers mapped to the one or more skills associated with the activity; generating from the set of information, a feature vector corresponding to each of the skill associated with the activity and predicting a proficiency level for each of the skill of the person in terms of a proficiency score wherein the proficiency score is calculated by providing the feature vector to one of (i) a pre-trained first model or (ii) a pre-trained second model (208), wherein training the first model for the skill comprising, receiving a set of training data for training the first model wherein the set of training data comprises a set of labelled pair of resumes, wherein each labelled pair of resumes of the set of labelled pair of resumes is associated with a relative proficiency level of the skill; extracting a list of information from the set of labelled pair of resumes using the information extraction tool; generating a list of feature vectors corresponding to the skill from the list of information and learning a proficiency estimation function to calculate the proficiency score of the skill, wherein the learning of the proficiency estimation function is performed using (i) a constraint loss function and (ii) a margin loss function, wherein the constraint loss function is computed using a set of constraints and wherein the set of constraints are empirically defined.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
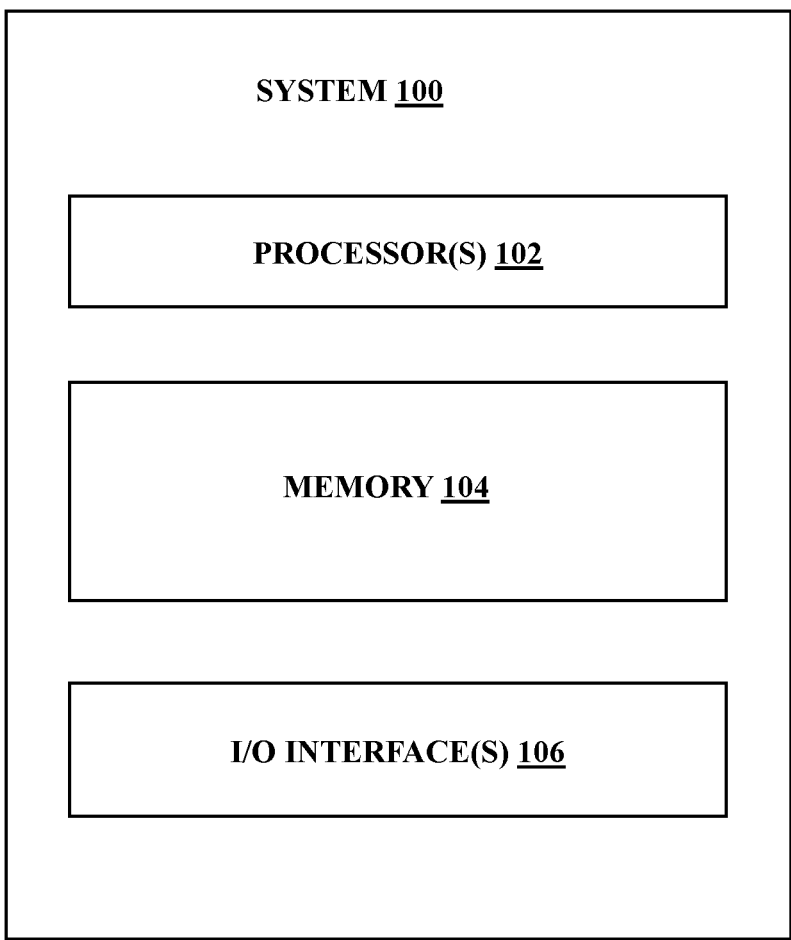
FIG. 1 illustrates an exemplary block diagram of a system for prediction of proficiency of person in skills from resume according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Assessing proficiency of a person in a skill need to be done in an accurate and precise manner. It becomes challenging when the assessment is done manually as it can be subjective when the resume is analyzed by more than one interviewer. Also, for suitable job recommendations a job portal of an organization may want to automatically assign proficiency levels to various skills for millions of resumes in their repository. To precisely assign proficiency levels of various skills for many resumes is a crucial task. The subjective assessments may incur errors and may vary person-to-person. To overcome these issues the embodiment in the present disclosure discloses a method to estimate the proficiency of the person automatically and quantitatively in a given skill(s) based on the person's resume.

A skill which is defined as a broad technical subject or area of knowledge includes many skill markers (SM) such as sub-skills, tools, and concepts in that subject, for example, the skill Machine Learning includes sub-skills like Reinforcement Learning, Deep Learning, tools like Keras, Weka and concepts like activation function, backpropagation. A resume may explicitly only mention some skill markers related to a skill, without mentioning the skill itself. For example, for the skill Database, we may find that a resume only mentions skill markers like PL/SQL, Oracle, JDBC. In a resume multiple skills are usually present in a resume and proficiencies among them may be inter-related. For example, Database, Java, Linux. To avoid this complication, proficiencies of multiple skills are estimated independently, assuming them to be independent of each other. Skill markers for a given skill have complex relationships among them, like IS A, PART OF etc. Such relationships among skill markers are ignored, and the simplifying assumption are made that all skill markers are at the same level of abstraction and complexity. However, the problem of estimating proficiency in a skill from the resume text remains challenging, because (i) it is non-trivial to identify which text indicates proficiency in that skill, (ii) decide quantitatively how much a piece of text contributes to the proficiency in the skill; and (iii) how to aggregate the proficiency estimated from various text segments.

Two techniques to automatically learn a skill proficiency estimation function are disclosed (i) a supervised neural network based technique where a novel loss function is introduced to combine label information with domain-specific constraints, and (ii) a weakly supervised clustering based technique.

In the present disclosure, the disclosed method is compared with two prior techniques and the technical advancement of the disclosed method over the two prior techniques are further described. The first prior technique is an Ordinal Regression Clustering technique, herein referred as $P_1$. $P_1$ is based on the ordinal regression clustering technique and is an unsupervised algorithm. Cluster boundaries of clusters from ordinal regression clustering are a set of parallel hyperplanes dividing the space in ordered clusters. The slope vector and the intercepts of the hyperplanes are the set of weights to be learned. The linear Support Vector Machine (SVM) algorithm is used as a component to find the set of hyperplanes in the multi-dimensional space that best separates the candidate resumes into different proficiency levels.

The second prior technique is a Supervised Linear Model, herein referred as $P_2$. $P_2$ learns the following linear function $$f(x) = 5.0 \times \sigma(W^T \cdot x + b) \qquad (1)$$

Where $x \in \mathbb{R}^8$ is a feature vector for a resume-skill combination. $\sigma$ is the sigmoid function whose output is in the range $[0,1]$ and hence the estimated proficiency score is in the range $[0,5]$. The parameters to be learned are $w \in \mathbb{R}^8$ and $b \in \mathbb{R}$. Annotated pairs of resumes are used where each resume pair is labeled with a relative proficiency label $\in \{1, -1, 0\}$ to train $P_2$ model to learn the scoring function. A neural network model with one linear layer is used and trained to optimize for the margin loss1 and margin loss2 functions. Stochastic Gradient Descent (SGD) is used to optimize the two loss functions and L2-regularization is used to avoid over-fitting. Once the $P_2$ model is trained, the learned weights are used to estimate proficiency score. The proficiency levels obtained using the $P_2$ supervised linear model tend to overestimate proficiency. Moreover, the estimated levels do not satisfy several constraints that are considered key by subject matter experts. For example, the experts usually do not assign any particular proficiency level to a person for a skill, unless the person has some minimum experience of using the skill. The disclosed method overcome the problems of the prior methods and the disclosed method for predicting proficiency level of the person in skills is further explained below.

Figure 2A:
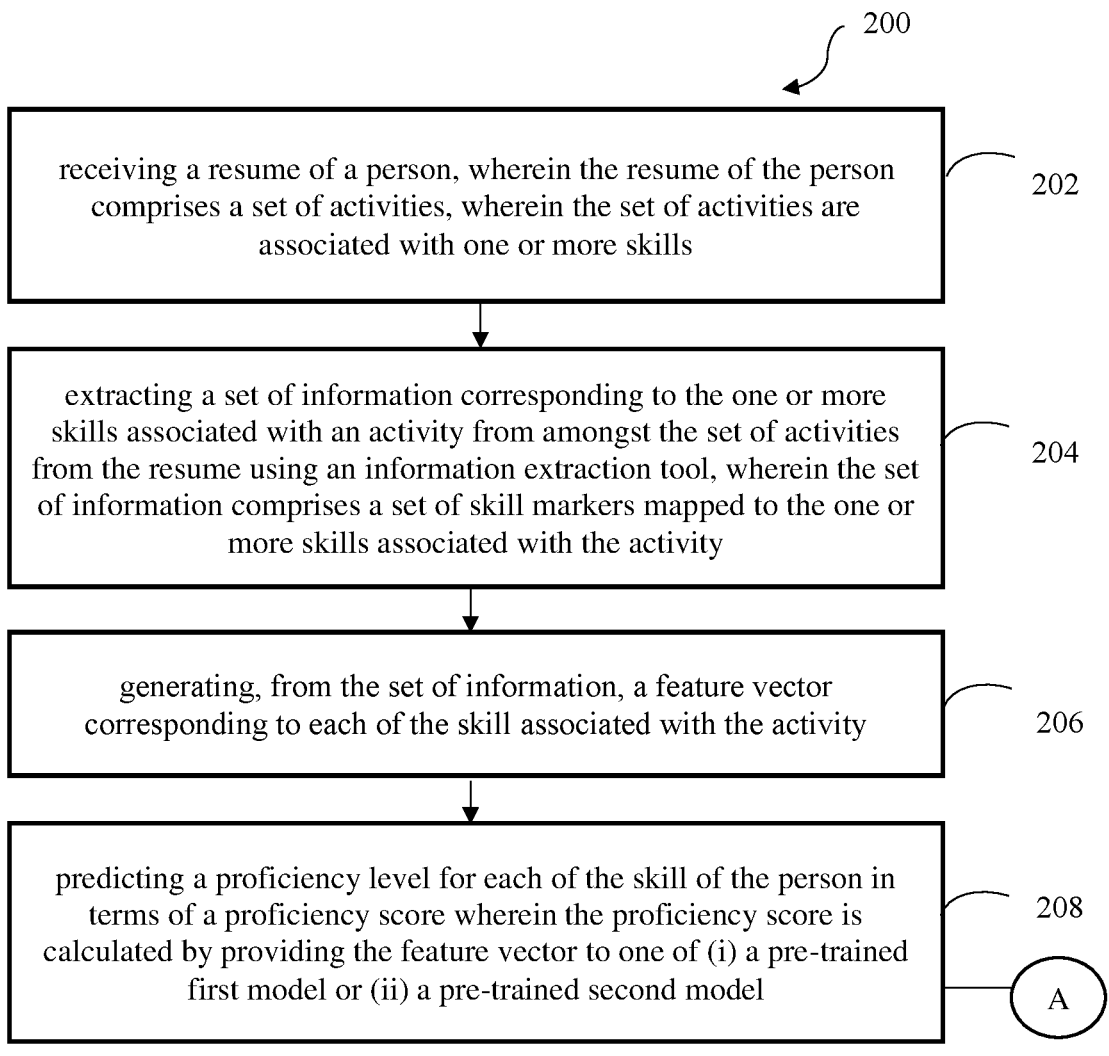
FIG. 2A and FIG. 2B is an exemplary flow diagram for a method for prediction of proficiency of person in skills from resume according to some embodiments of the present disclosure.
Figure 2B:
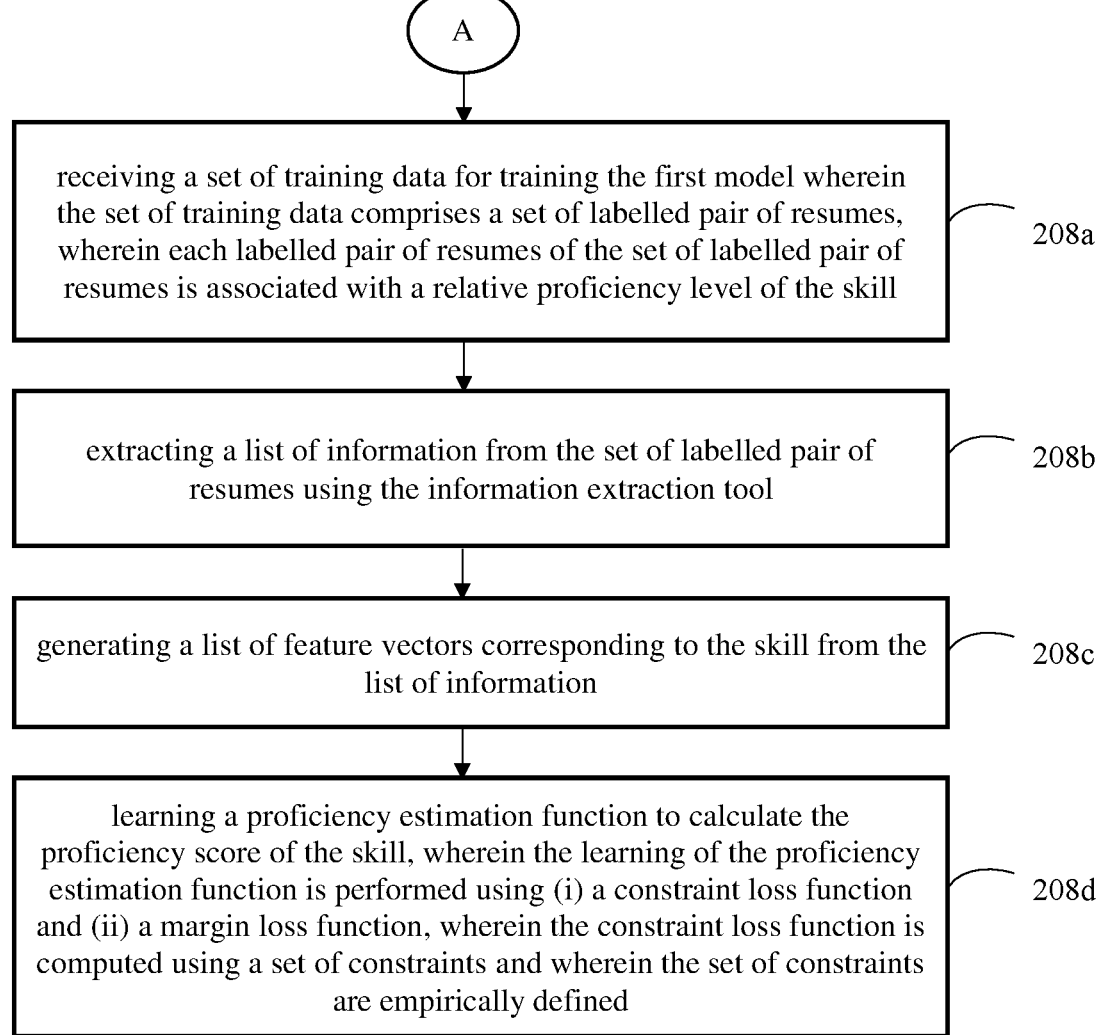

Referring now to the drawings, and more particularly to FIG. 1 through FIG. 2B, where similar reference characters denote corresponding features consistently throughout the figures, there are shown preferred embodiments and these embodiments are described in the context of the following exemplary system and/or method.

FIG. 1 illustrates a system 100 for prediction of proficiency of the person in skills from resume, according to some embodiments of the present disclosure. In an embodiment, the system 100 includes one or more processors 102, communication interface device(s) or input/output (I/O) interface(s) 106, and one or more data storage devices or memory 104 operatively coupled to the one or more processors 102. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions.

Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

FIG. 2A and FIG. 2B is an exemplary flow diagram for a method for prediction of proficiency of the person in skills from resume according to some embodiments of the present disclosure. In an embodiment of the present disclosure, the one or more processors 102 are configured to receive at step 202, the resume of the person for predicting proficiency of the person in the skill. The resume of the person comprises a set of activities, wherein the set of activities are associated with one or more skills. Let AT be the set of activity types that involve the use of the skill s. For example, AT={certification, course, degree, project, employment, paper, patent, award}. Let T be the set of tasks in the domain, each of which involves the use of the given skill s. A task is defined to be a well-defined knowledge-based volitional action with a specific goal, for example, prepare test plan, database design, coding, bug fixing, produce flowcharts. Let R denote a set of all roles, for example, Developer, Test Engineer, Project Leader, GUI Designer etc.

In an embodiment of the present disclosure, the one or more processors 102 are configured to extract at step 204 a set of information corresponding to the one or more skills associated with an activity from amongst the set of activities from the resume using an information extraction tool, wherein the set of information comprises a set of skill markers mapped to the one or more skills associated with the activity. The set of information is extracted from the resume associated with the activity, where the activity is represented as a tuple $A=(a_t, a_s, a_{dur}, a_T, a_R)$ where $a_t \in AT$ is the activity type, $a_s \subset S$ is the set of skill markers associated with the activity, $a_{dur}$ is the duration of the activity, $a_T \subset T$ is the set of tasks executed as part of the activity, and $a_R \subset R$ are the set of roles performed in the activity. Table 1 shows an example of the set of information for an activity of type project for skill Java extracted from a resume.

In an embodiment, each skill marker in the set of skill markers is mapped to the skill. The step of mapping initially receives a list of skill markers corresponding to the skill. Further a list of concepts connected to the list of skill markers are identified in an ontology through relations indicating generalization. "hypernym" relation in WordNet (e.g., "dog"→hypernym→"canine"), "dct: subject" relation in DBPedia (e.g., "TensorFlow"→dct:subject→"dbc:Deep_ learning", IS-A relation in any general ontology (e.g., "Java"→IS-A→"Programming Language") are a few examples for generalization relation types in ontologies. The subject matter expert identifies a list of relevant concepts by discarding a list of irrelevant concepts from the list of concepts. A first list of skill markers connected to the list of relevant concepts in the ontology through relations indicating specialization is generated. A few examples for specialization relation types in ontologies are "hyponym" relation in WordNet (e.g., "canine"→hyponym→"dog"), "is dct:subject of" relation in DBPedia (e.g., "dbc:Deep_learning"→is dct:subject of →"TensorFlow"), HAS-INSTANCE relation in any general ontology (e.g., "Programming Language"→HAS-INSTANCE→"Java"). In the disclosed method, the first list of skill markers corresponding to the skill are generated using DBPedia. After receiving the list of skill markers corresponding to the skill, a list of DBPedia categories corresponding to the list of skill markers are identified. A list of relevant DBPedia categories is identified by discarding a list of irrelevant DBPedia categories from the list of DBPedia categories. Further a first list of skill markers corresponding to the list of relevant DBPedia categories are generated.

Further, in the mapping the first list of skill markers is updated. The steps of updating the first list of skill markers comprises receiving a second plurality of resumes and further a second list of skill markers are identified from the second plurality of resumes. The identified second list of skill markers are co-located with the first list of skill markers. A new skill marker which is co-located with any one or more skill markers from the first list of skill markers are selected. The new skill marker is verified by the subject matter expert and added to the second list of skill markers. The second list of skill markers may be in the same line or sentence of that of the first list of skill markers in the resume. The first list of skill markers is updated by adding the second list of skill markers to the first list of skill markers.

TABLE 1

| Duration in months | Skill markers | Roles | Tasks |
|---|---|---|---|
| 24 | Java, Struts, J2EE, Tomcat, Log4J, Junit, Web services | Backend developer | System Architecture Design, Design data models |
| 24 | Java, J2EE, Spring, Hibernate, Jboss, SQL, Oracle 10 g | Backend developer, Web developer | Implement a web friendly web UI, Implement modules, fast tracking and closure for essential change requirements, led the team |
| 5.5 | Java Restful web services, Angular, Typescript, Javascript, Jasmine/karma | Web developer | Creating and rendering Backbase widgets, Using Jasmine/karma for unit tests, Work with Agile process, Implement complex business logic |

The set of information is extracted from resume in terms of entity and relation types. For skill proficiency estimation, skill markers, certifications, and project details are extracted. A joint entity and relation extraction technique is used for extracting project details by modeling it as a PROJECT relation type. The relation between entity types Project Title, Duration, Role, Skill marker, and Task are captured. Each mention of this relation type is similar to the tuples shown in Table 1.

In an embodiment of the present disclosure, the one or more processors 102 are configured to generate at step 206 from the set of information, a feature vector corresponding to each of the skill associated with the activity. The activity from the resume is mapped to the feature vector wherein the feature vector is represented as a set of features corresponding to the skill.

For computing feature values, the entities such as SM (Skill marker), Duration, Role, Task, and Certification are extracted. Three different techniques such as Linguistic patterns, CRF based on manually engineered features, and BiLSTM-based entity extractor and an ensemble of their predictions are used for entity extraction. PROJECT relation type is extracted for computing project-related feature values. This relation is extracted by identifying a section of a resume (i.e., sequence of sentences) such that all the sentences in this section correspond to a single project. The corresponding PROJECT relation tuple is then constructed by linking together the entity mentions occurring within this section. A resume where 2 project sections are identified, where each project leads to a single PROJECT relation tuple, such sections are realized by labeling each sentence in a resume with an appropriate label in BIO encoding (i) B-PROJECT indicates that the current sentence is the first sentence of a project section, (ii) I-PROJECT indicates that the current sentence is part of the same project section as the previous sentence, and (iii) 0 indicates that the sentence does not belong to any project. Overall model architecture is based on a hierarchical BiLSTM model where (i) the horizontal BiLSTM-CRF layer accepts a sequence of words as input and predicts entity type labels, and (ii) the vertical BiLSTM-CRF layer accepts a sequence of sentences as input and predicts relation type labels. A sentence is represented by concatenating sentence representation by the horizontal BiLSTM and a vector representing the presence of entity types in the sentence. This model is trained in the pipeline fashion by sequentially training the horizontal BiLSTM-CRF layer and then the vertical BiLSTM-CRF layer. During inference for a new resume, the entity extraction output consists of an ensemble of extractions by linguistic patterns, CRF-based entity extractor and the horizontal BiLSTM-CRF layer. The PROJECT relation tuples are constructed using this entity extraction output and sentence labels are predicted by the vertical BiLSTM-CRF layer.

The set of features corresponding to the skill includes, 1. a total duration of the skill corresponding to an activity ($x_1$), 2. number of activities corresponding to the skill ($x_2$), 3. number of activities corresponding to the skill ($x_3$), 4. number of distinct roles of the skill corresponding to the activity ($x_4$), 5. number of distinct skill markers mentioned in the activity corresponding to the skill ($x_5$), 6. ratio of ($x_4$) to total number of skill markers (whether or not corresponding to the skill) mentioned in the activity corresponding to the skill ($x_6$), 7. number of distinct certifications or courses corresponding to the skill ($x_7$), 8. number of distinct skill markers corresponding to the skill mentioned anywhere in the resume ($x_8$).

With reference to Table 1, the activity PROJECT extracted from the resume is mapped to the set of features for skill s which is provided in Table 2. Similar features can be constructed using any other activity types like 'employment', 'degree', 'course' and so on.

TABLE 2

| Features | Values for the example in Table 1 |
| --- | --- |
| x1: total duration of all projects related to skill s in months | 53.5 (sum of durations of the 3 projects related to Java) |
| x2: number of projects related to s | 3 (there are 3 projects related to Java) |
| x3: number of distinct roles in projects related to s | 2 (Backend developer & Web developer) |
| x4: number of distinct skill markers related to s mentioned within projects | 15 (all skill markers except SQL and Oracle 10 g are related to Java) |
| x5: number of distinct tasks mentioned in projects related to s | 10 (2 + 4 + 4 tasks in the 3 projects) |
| x6: ratio of x4 to total number of skill markers (whether or not related to s) mentioned in projects related to s | 0.88 (15/17 where there are 17 distinct skill markers within these projects) |
| x7: number of distinct certifications or courses related to s | 1 (not shown in Table 1, a certification mentioned elsewhere in the resume) |
| x8: number of distinct skill markers related to s mentioned any-where in the resume | 25 (not shown in Table 1, 10 more skill markers mentioned outside projects) |

The example in Table 1 maps to the feature vector x=(53.5, 3, 2, 15, 10, 0.88, 1.25). The current set of features is mainly based on the project and certification activity types, although the extension to other activity types is straightforward. The features are neutral with respect to demographic details like gender to avoid unfair or biased estimations.

In an embodiment of the present disclosure, the one or more processors 102 are configured to predict at step 208 a proficiency level for each of the skill of the person in terms of a proficiency score wherein the proficiency score is calculated by providing the feature vector to one of (i) a pre-trained first model ($M_1$) or (ii) a pre-trained second model ($M_2$). The disclosed method learns a function that maps any $x \in \mathbb{R}^8$ to one of the predefined proficiency levels, from the lowest proficiency level to highest proficiency level. For example, if a function is learned to map to five proficiency levels, from $E_0$ (lowest proficiency level) to $E_4$ (highest proficiency level)-$f_s: \mathbb{R}^8 \rightarrow \{E_0, E_1, E_2, E_3, E_4\}$.

In an embodiment, the first model is trained to calculate the proficiency score of the person. The training of the first model is explained in the further steps as depicted in FIG. 2B. At step 208a, the one or more processors 102 are configured to receive a set of training data for training the first model. The set of training data comprises a set of labelled pair of resumes, wherein each labelled pair of resumes of the set of labelled pair of resumes is associated with a relative proficiency level of the skill. Relative proficiency labels for each pair of resumes $<R_i, R_j>$ created for a skill s, are labelled as follows:

1: $R_i$ has better proficiency in skill s as compared to $R_j$

−1: $R_j$ has better proficiency in skill s as compared to $R_i$

0: Both $R_i$ and $R_j$ have comparable proficiency in skill s

In an embodiment, the one or more processors 102 are configured to extract at step 208b a list of information from the set of labelled pair of resumes using the information extraction tool. The list of information comprises the set of skill markers corresponding to each skill, duration of project for each skill marker, a set of roles corresponding to each skill marker, a set of tasks corresponding to each skill marker.

In an embodiment, the one or more processors 102 are configured to generate at step 208c a list of feature vectors corresponding to the skill from the list of information. The feature vector comprises the set of features.

In an embodiment, the one or more processors 102 are configured to learn at step 208d a proficiency estimation function to calculate the proficiency score of the skill, wherein the learning of the proficiency estimation function is performed using (i) a constraint loss function and (ii) a margin loss function, wherein the constraint loss function is computed using a set of constraints and wherein the set of constraints are empirically defined. The first model is trained using the constraint loss function and the margin loss function. The estimated proficiency levels using the prior methods $P_1$ and $P_2$ does not satisfy several constraints. Hence these prior models tend to overestimate proficiency. The present disclosed method integrates domain constraints while training the first model which specify the upper bound on the skill proficiency level of the person. Given a set of such constraints, UB(x) is calculated which is the maximum allowable proficiency level for x considering all the constraints. UB(x) is the highest possible proficiency level for x above which at least one constraint gets violated. As these are not hard constraints, these are integrated in the training of the first model by introducing the constraint loss function which incurs a loss proportional to the extent to which the constraint is violated. The constraint loss function is represented as $$\text{loss}_{cons} = (\max(0, f(x) - UB(x)) + \max(0, f(y) - UB(y)))/2 \qquad (2)$$

where x and y are resumes and $\langle x, y \rangle$ is any labelled pair of resumes from the set of labelled pair of resumes, UB(x) and UB(y) are the maximum allowable proficiency level for the skill for the x and y resumes respectively, f(x) and f(y) are the proficiency level for the skill associated with the x and y resumes respectively. A set of domain constraints are integrated, and the first model is trained. For an instance, the domain constraints considered for training the first model are "If x1<12 then f(x)<1; If x1<36 then f(x)<2; If x1<72 then f(x)<3; If x1<120 then f(x)<4" (A person needs to have at least 12 months of project experience in a skill to be qualified for $E_1$ proficiency level, at least 36 months of project experience for $E_2$ and so on.)

The first model is trained using the margin loss function along with the constraint loss function. The margin loss function is represented as, $$\text{loss}_1 = \max(0, 1 - (f(x) - f(y))) \qquad (3)$$

$$\text{loss}_2 = \max(0, |f(x) - f(y)| - 1)$$

$$\text{loss}_{margin} = \text{loss}_1 + \text{loss}_2$$

where x and y are resumes and (x, y) is any labelled pair of resumes from the set of labelled pair of resumes.

In an embodiment, a non-linear function is learned for predicting the proficiency level of skill of the person. The non-linear function is represented as $$f(x) = 5.0 \times \sigma\left(w^T \cdot ReLU(W_h \cdot x + b_h) + b\right) \qquad (4)$$

A hidden layer of 10 units is introduced, a is the sigmoid activation function and ReLU is the rectified linear unit activation function. $W_h \in \mathbb{R}^{10 \times 8}$, $b_h \in \mathbb{R}^{10}$, $w \in \mathbb{R}^{10}$ and $b \in \mathbb{R}$ (bias) are the learnable parameters of the model. $\lambda = 0.7$ based on 5-fold cross-validation is used.

In an embodiment, the proficiency level of the skill may also be predicted using the pre-trained second model. The second model is trained by receiving a first plurality of resumes wherein each resume of the first plurality of resumes is associated with a proficiency level of the skill. The second model is based on clustering unlabeled instances. The first plurality of resumes is clustered using k-means clustering to obtain a set of clusters wherein each cluster of the set of clusters is represented with a feature vector corresponding to (i) a cluster center and (ii) a cluster representative resume. Each cluster is then represented with an 8-dimensional feature vector corresponding to the cluster center and an actual representative resume whose feature vector is closest to the center. Further a proficiency score of the skill is annotated to each cluster in the set of clusters based on (i) the cluster center and (ii) the cluster representative resume. The proficiency score is annotated by a subject matter expert to each cluster by inspecting the cluster center and its representative resume.

In an embodiment, the proficiency level of the skill of the person is predicted using the above mentioned pre-trained second model. The prediction comprises finding a cluster corresponding to the resume of the person based on the feature vector of the resume of the person. The cluster center of the cluster is the nearest cluster center and corresponds to the resume of the person. Further a proficiency score which is annotated to the cluster is assigned to the cluster as the proficiency score of the skill of the person.

In an embodiment, the present disclosure is capable of handling new skills. When a resume which contains new skills are received, the present method handles and predicts the proficiency skill of the new skill. The disclosed method (both the first model and the second model) is extended to predict the proficiency skill of the new skill. In case of the first model, training instances of all skills are combined and trained to a single combined model. Similarly, in case of the second model all the feature vectors across multiple skills are combined and clustered together. Further cluster centers are annotated with appropriate proficiency level.

EXPERIMENTAL RESULTS: A set of 10290 resumes of IT professionals are considered for the experiments. The project information along with skill markers and certifications is extracted automatically from these resumes using the information extraction technique. At first the resumes are converted in PDF format to plain text using Apache PDFBox2. Resumes in Microsoft Word format are first converted to HTML format and text is extracted from HTML. Further NLP pre-processing such as sentence splitting, tokenization, part-of-speech tagging, dependency parsing etc. are done. The information of blank lines is retained in the resumes by introducing a place-holder sentence <BLANK LINE> as it is useful to capture project boundaries in some cases. The extracted information is further processed for facilitating features generation for skill proficiency estimation. Extracted durations are automatically converted to months, e.g., September 2019-November 2019 is converted to 3 months. The duration is assumed to be 6 months for projects which do not explicitly mention it. Further feature vectors are generated for each resume for each major skill (Java, Python, Machine Learning, Databases, Embedded Systems). The feature vectors in each skill's dataset are transformed so that each feature has a mean of 0 and standard deviation of 1, and the feature values have similar scale across different features. For each skill, only those feature vectors (resumes) are retained which have a non-zero value for x8, resumes with x8=0 have default proficiency level of $E_{-1}$ indicating no exposure to the skill. Two sub-sets of resumes for each skill are set for training and evaluation $$(i)\ D_s^{train}:$$

training set of 25 resumes used to create 150 resume pairs which are annotated by human experts for relative proficiency (0, 1, −1), (ii)

$$D_s^{eval}:$$

evaluation set of 50 resumes which are annotated by human experts for explicit proficiency levels ($E_0$ to $E_4$). The performance of the methods $P_1$, $P_2$ and of the disclosed methods (the first model and the second model) are evaluated and compared using three metrics.
1. Relative ordering accuracy: It is computed as the fraction of labelled pairs (in the training datasets $$D_s^{train})$$

for which the class label (1/−1/0) was predicted correctly. For supervised techniques, the numbers are reported after 5-fold cross-validation over these datasets.
2. Average absolute error: It is the average of absolute differences between the expected and predicted proficiency levels for each resume in the evaluation datasets $$D_s^{eval}.$$

3. Constraints violation factor: It is the fraction of resumes in the evaluation datasets $$D_s^{eval}$$

for which the predicted proficiency levels are violating the domain constraints.

Table 3, 4 and 5 shows evaluation results of all the techniques on datasets of 5 skills. Although, $P_2$ is the best technique in terms of relative evaluation, $M_1$ performs better overall considering all the three evaluation metrics. A dimensionality reduction using t-Distributed Stochastic Neighbor Embedding (t-SNE) is performed followed by clustering in reduced dimensional space (d=2) where the said method is referred as $$M_2^{tSNE}.\ M_2\ \text{and}\ M_2^{tSNE}$$

also perform comparably with $M_1$ in terms of average absolute error and they require lesser annotation efforts as compared to $M_1$. Unlike $P_2$ which is trained to learn only the correct relative order and $M_2$ which does not consider relative ordering explicitly, $M_1$ is trained to learn relative ordering as well as constraints on the absolute proficiency levels and therefore it is the overall best technique. For the use-cases where only relative ordering of resumes for a particular skill is enough, the techniques $P_2$ and $M_1$ can be used. On the other hand, if the use-case requires exact proficiency level to be known, then $$M_1,\ M_2\ \text{and}\ M_2^{tSNE}$$

would be useful.

TABLE 3

| | Relative ordering accuracy | | | | |
|---|---|---|---|---|---|
| Skill | $P_1$ | $P_2$ | $M_1$ | $M_2$ | $M_2^{tSNE}$ |
| Java | 0.43 | 0.63 | 0.66 | 0.41 | 0.44 |
| Python | 0.54 | 0.70 | 0.61 | 0.45 | 0.45 |
| DB | 0.56 | 0.57 | 0.53 | 0.23 | 0.51 |
| ES | 0.44 | 0.52 | 0.46 | 0.46 | 0.29 |
| ML | 0.59 | 0.73 | 0.63 | 0.52 | 0.56 |
| Avg. | 0.51 | 0.63 | 0.58 | 0.41 | 0.45 |

TABLE 4

| | Average absolute error | | | | |
|---|---|---|---|---|---|
| Skill | $P_1$ | $P_2$ | $M_1$ | $M_2$ | $M_2^{tSNE}$ |
| Java | 0.80 | 1.50 | 0.68 | 0.74 | 0.82 |
| Python | 2.08 | 2.48 | 0.58 | 0.52 | 0.36 |
| DB | 1.16 | 1.76 | 0.78 | 1.10 | 0.96 |
| ES | 2.06 | 2.46 | 0.48 | 0.58 | 0.54 |
| ML | 1.88 | 2.22 | 0.51 | 0.51 | 0.56 |
| Avg. | 1.60 | 2.08 | 0.61 | 0.69 | 0.65 |

TABLE 5

| | Constraints violation factor | | | | |
|---|---|---|---|---|---|
| Skill | $P_1$ | $P_2$ | $M_1$ | $M_2$ | $M_2^{tSNE}$ |
| Java | 0.04 | 0.58 | 0.08 | 0.12 | 0.18 |
| Python | 1.00 | 1.00 | 0.56 | 0.36 | 0.24 |
| DB | 0.66 | 0.78 | 0.18 | 0.10 | 0.54 |
| ES | 0.9 | 1.00 | 0.14 | 0.02 | 0.22 |
| ML | 0.86 | 0.96 | 0.40 | 0.31 | 0.40 |
| Avg. | 0.69 | 0.86 | 0.27 | 0.18 | 0.32 |

Table 6, 7 and 8 shows evaluation results when the combined models are used. For the two new skills SAP and CV, $$M_2^{tSNE}$$

performs slightly better than $M_1$ considering the average absolute error over two new skills.

TABLE 6

| | | | Relative ordering accuracy | | |
|---|---|---|---|---|---|
| Skill | $P_1$ | $P_2$ | $M_1$ | $M_2$ | $M_2^{tSNE}$ |
| Java | 0.45 | 0.55 | 0.63 | 0.51 | 0.44 |
| Python | 0.47 | 0.64 | 0.55 | 0.35 | 0.47 |
| DB | 0.51 | 0.56 | 0.52 | 0.31 | 0.28 |
| ES | 0.32 | 0.56 | 0.48 | 0.33 | 0.33 |
| ML | 0.53 | 0.69 | 0.61 | 0.41 | 0.51 |
| Avg. | 0.45 | 0.60 | 0.56 | 0.38 | 0.41 |
| SAP | | | NA | | |
| CV | | | NA | | |

TABLE 7

| | | | Average absolute error | | |
|---|---|---|---|---|---|
| Skill | $P_1$ | $P_2$ | $M_1$ | $M_2$ | $M_2^{tSNE}$ |
| Java | 1.2 | 1.54 | 0.72 | 0.72 | 0.86 |
| Python | 1.2 | 1.60 | 0.30 | 0.68 | 0.60 |
| DB | 1.28 | 1.68 | 0.72 | 0.68 | 0.70 |
| ES | 1.38 | 1.52 | 0.48 | 0.74 | 0.82 |
| ML | 1.57 | 1.82 | 0.49 | 0.51 | 0.58 |
| Avg. | 1.33 | 1.63 | 0.54 | 0.66 | 0.71 |
| SAP | 1.18 | 1.02 | 0.90 | 0.68 | 0.62 |
| CV | 0.88 | 1.08 | 0.30 | 0.54 | 0.52 |

TABLE 8

| | | | Constraints violation factor | | |
|---|---|---|---|---|---|
| Skill | $P_1$ | $P_2$ | $M_1$ | $M_2$ | $M_2^{tSNE}$ |
| Java | 0.4 | 0.58 | 0.06 | 0.14 | 0.16 |
| Python | 0.74 | 1.00 | 0.26 | 0.58 | 0.44 |
| DB | 0.68 | 0.76 | 0.24 | 0.46 | 0.40 |
| ES | 0.72 | 0.90 | 0.04 | 0.42 | 0.38 |
| ML | 0.8 | 0.96 | 0.36 | 0.56 | 0.51 |
| Avg. | 0.67 | 0.84 | 0.19 | 0.43 | 0.38 |
| SAP | 0.52 | 0.58 | 0.00 | 0.30 | 0.34 |
| CV | 0.60 | 0.94 | 0.00 | 0.48 | 0.18 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein predicts the proficiency level of multiple skills of the person from resume. The disclosed method extracts skills and other related information from resume and generates feature vector. The feature vectors are provided to two techniques to learn a skill estimation function. The first technique includes a supervised neural network based technique where a novel loss function is disclosed to combine label information with domain-specific constraints. The second technique includes a weakly supervised clustering based technique. Using any of these two techniques, the proficiency level of the skill of the person is predicted.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:

receiving, via one or more hardware processors, a resume of a person, wherein the resume of the person comprises a set of activities, wherein the set of activities are associated with one or more skills;

extracting, via the one or more hardware processors, a set of information corresponding to the one or more skills associated with an activity from amongst the set of activities from the resume using an information extraction tool, wherein the set of information comprises a set of skill markers mapped to the one or more skills associated with the activity;

generating, via the one or more hardware processors, from the set of information, a feature vector corresponding to each of the skill associated with the activity, wherein for computing feature values, entities including the skill marker, duration, role, task, and certification are extracted, and a bidirectional long short-term memory (BiLSTM)-based entity extractor, and an ensemble of predictions are used for an entity extraction, and wherein while inferencing a new resume, an output of the entity extraction includes an ensemble of extractions by linguistic patterns, conditional random fields (CRFs)-based entity extractor, and a horizontal BiL-STM-CRF layer; and predicting, via the one or more hardware processors, a proficiency level for each of the skill of the person in terms of a proficiency score, wherein the proficiency score is calculated by providing the feature vector to a pre-trained first model, wherein training the first model for the skill comprising, receiving, via the one or more hardware processors, a set of training data for training the first model, wherein the set of training data comprises a set of labelled pair of resumes, wherein each labelled pair of resumes of the set of labelled pair of resumes is associated with a relative proficiency level of the skill;

extracting, via the one or more hardware processors, a list of information from the set of labelled pair of resumes using the information extraction tool;

generating, via the one or more hardware processors, a list of feature vectors corresponding to the skill from the list of information;

learning, via the one or more hardware processors, a proficiency estimation function to calculate the proficiency score of the skill, wherein the learning of the proficiency estimation function is performed using (i) a constraint loss function and (ii) a margin loss function, wherein the constraint loss function is computed using a set of constraints, and wherein the set of constraints are empirically defined, wherein the constraint loss function is represented as:

$$loss_{cons} = (\max(0, f(x) - UB(x)) + \max(0, f(y) - UB(y)))/2$$

where x and y are resumes and $\langle x, y \rangle$ is any labelled pair of resumes from the set of labelled pair of resumes, UB(x) and UB(y) are the maximum allowable proficiency level for the skill for the x and y resumes respectively, f(x) and f(y) are the proficiency level for the skill associated with the x and y resumes respectively, and using the constraint loss function and the margin loss function, and integrating domain constraints which specify upper bound on the proficiency level for each of the skill of the person, for training the first model.

2. The process implemented method of claim 1, wherein the margin loss function is represented as:

$$loss_1 = \max(0, 1 - (f(x) - f(y)))$$

$$loss_2 = \max(0, |f(x) - f(y)| - 1)$$

$$loss_{margin} = loss_1 + loss_2$$

where x and y are resumes and $\langle x, y \rangle$ is any labelled pair of resumes from the set of labelled pair of resumes.

3. The process implemented method of claim 1, wherein the feature vector is represented as a set of features corresponding to the skill, wherein the set of features corresponding to the skill includes;

1. a total duration of the skill corresponding to an activity $(x_1)$,
2. number of activities corresponding to the skill $(x_2)$,
3. Number of distinct tasks mentioned in the activities corresponding to the skill $(x_3)$,
4. number of distinct roles corresponding to the activity $(x_4)$,
5. number of distinct skill markers mentioned in the activity corresponding to the skill $(x_5)$,
6. ratio of $(x_4)$ to total number of skill markers (whether or not corresponding to the skill) mentioned in the activity corresponding to the skill $(x_6)$,
7. number of distinct certifications or courses corresponding to the skill $(x_7)$, and
8. number of distinct skill markers corresponding to the skill mentioned anywhere in the resume $(x_8)$.

4. The processor implemented method of claim 1, wherein the mapping of each skill marker to the skill comprising, receiving, via the one or more hardware processors, a list of skill markers corresponding to the skill;

identifying, via the one or more hardware processors, a list of concepts connected to the list of skill markers in an ontology through relations indicating generalization;

identifying, via the one or more hardware processors, from the list of concepts, a list of relevant concepts by discarding a list of irrelevant concepts; and generating, via the one or more hardware processors, a first list of skill markers connected to the list of relevant concepts in the ontology through relations indicating specialization.

5. The process implemented method of claim 4, further comprises updating the first list of skill markers wherein the updating comprising, receiving, via the one or more hardware processors, a second plurality of resumes;

identifying, via the one or more hardware processors, a second list of skill markers from the second plurality of resumes, wherein the second list of skill markers are co-located with the first list of skill markers in the second plurality of resumes; and updating, via the one or more hardware processors, the first list of skill markers by adding the second list of skill markers to the first list of skill markers.

6. A system comprising:

a memory storing instructions;

one or more communication interfaces; and one or more hardware processors coupled to the memory via the one or more communication interfaces, wherein the one or more hardware processors are configured by the instructions to:

receive a resume of a person, wherein the resume of the person comprises a set of activities, wherein the set of activities are associated with one or more skills;

extract a set of information corresponding to the one or more skills associated with an activity from amongst the set of activities from the resume using an information extraction tool, wherein the set of information comprises a set of skill markers mapped to the one or more skills associated with the activity;

generate from the set of information, a feature vector corresponding to each of the skill associated with the activity, wherein for computing feature values, entities including the skill marker, duration, role, task, and certification are extracted, and a bidirectional long short-term memory (BiLSTM)-based entity extractor, and an ensemble of predictions are used for an entity extraction, and wherein while inferencing a new resume, an output of the entity extraction includes an ensemble of extractions by linguistic patterns, conditional random fields (CRFs)-based entity extractor, and a horizontal BiLSTM-CRF layer; and predict a proficiency level for each of the skill of the person in terms of a proficiency score wherein the proficiency score is calculated by providing the feature vector to a pre-trained first model, wherein training the first model for the skill comprising, receive a set of training data for training the first model wherein the set of training data comprises a set of labelled pair of resumes, wherein each labelled pair of resumes of the set of labelled pair of resumes represents a relative proficiency level of the skill;

extract a list of information from the set of labelled pair of resumes using the information extraction tool;

generate a list of feature vectors corresponding to the skill from the list of information; and learn a proficiency estimation function to calculate the proficiency score of the skill, wherein the learning of the proficiency estimation function is performed using (i) a constraint loss function and (ii) a margin loss function, wherein the constraint loss function is computed using a set of constraints, and wherein the set of constraints are empirically defined, wherein the constraint loss function is represented as:

$$loss_{cons} = (\max(0, f(x) - UB(x)) + \max(0, f(y) - UB(y)))/2$$

where x and y are resumes and $\langle x, y \rangle$ is any labelled pair of resumes from the set of labelled pair of resumes, UB(x) and UB(y) are the maximum allowable proficiency level for the skill for the x and y resumes respectively, f(x) and f(y) are the proficiency level for the skill associated with the x and y resumes respectively.

7. The system of claim 1, wherein the margin loss function is represented as:

$$loss_1 = \max(0, 1 - (f(x) - f(y)))$$

$$loss_2 = \max(0, |f(x) - f(y)| - 1)$$

$$loss_{margin} = loss_1 + loss_2$$

where x and y are resumes and $\langle x, y \rangle$ is any labelled pair of resumes from the set of labelled pair of resumes.

8. The system of claim 1, wherein the feature vector is represented as a set of features corresponding to the skill, wherein the set of features corresponding to the skill includes:

1. a total duration of the skill corresponding to an activity $(x_1)$,
2. number of activities corresponding to the skill $(x_2)$,
3. number of distinct tasks mentioned in the activities corresponding to the skill $(x_3)$,
4. number of distinct roles of the skill corresponding to the activity $(x_4)$,
5. number of distinct skill markers mentioned in the activity corresponding to the skill $(x_5)$,
6. ratio of $(x_4)$ to total number of skill markers (whether or not corresponding to the skill) mentioned in the activity corresponding to the skill $(x_6)$,
7. number of distinct certifications or courses corresponding to the skill $(x_7)$, and
8. number of distinct skill markers corresponding to the skill mentioned anywhere in the resume $(x_8)$.

9. The system of claim 1, wherein the mapping of each skill marker to the skill comprising, receiving, via the one or more hardware processors, a list of skill markers corresponding to the skill;

identifying, via the one or more hardware processors, a list of concepts connected to the list of skill markers in an ontology through relations indicating generalization;

identifying, via the one or more hardware processors, from the list of concepts, a list of relevant concepts by discarding a list of irrelevant concepts; and generating, via the one or more hardware processors, a first list of skill markers connected to the list of relevant concepts in the ontology through relations indicating specialization.

10. The system of claim 4, further comprises updating the first list of skill markers wherein the updating comprising, receiving, via the one or more hardware processors, a second plurality of resumes;

identifying, via the one or more hardware processors, a second list of skill markers from the second plurality of resumes, wherein the second list of skill markers are co-located with the first list of skill markers in the second plurality of resumes; and updating, via the one or more hardware processors, the first list of skill markers by adding the second list of skill markers to the first list of skill markers.

11. One or more non-transitory machine-readable information storage mediums comprising one or more instructions which when executed by one or more hardware processors cause:

receiving, a resume of a person, wherein the resume of the person comprises a set of activities, wherein the set of activities are associated with one or more skills;

extracting a set of information corresponding to the one or more skills associated with an activity from amongst the set of activities from the resume using an information extraction tool, wherein the set of information comprises a set of skill markers mapped to the one or more skills associated with the activity;

generating from the set of information, a feature vector corresponding to each of the skill associated with the activity, wherein for computing feature values, entities including the skill marker, duration, role, task, and certification are extracted, and a bidirectional long short-term memory (BiLSTM)-based entity extractor, and an ensemble of predictions are used for an entity extraction, and wherein while inferencing a new resume, an output of the entity extraction includes an ensemble of extractions by linguistic patterns, conditional random fields (CRFs)-based entity extractor, and a horizontal BiLSTM-CRF layer; and predicting a proficiency level for each of the skill of the person in terms of a proficiency score wherein the proficiency score is calculated by providing the feature vector to a pre-trained first model, wherein training the first model for the skill further comprising, receiving a set of training data for training the first model wherein the set of training data comprises a set of labelled pair of resumes, wherein each labelled pair of resumes of the set of labelled pair of resumes is associated with a relative proficiency level of the skill;

extracting a list of information from the set of labelled pair of resumes using the information extraction tool;

generating a list of feature vectors corresponding to the skill from the list of information; and learning a proficiency estimation function to calculate the proficiency score of the skill, wherein the learning of the proficiency estimation function is performed using (i) a constraint loss function and (ii) a margin loss function, wherein the constraint loss function is computed using a set of constraints, and wherein the set of constraints are empirically defined, wherein the constraint loss function is represented as:

$$loss_{cons} = (\max(0, f(x) - UB(x)) + \max(0, f(y) - UB(y)))/2$$

where x and y are resumes and $\langle x, y \rangle$ is any labelled pair of resumes from the set of labelled pair of resumes, UB(x) and UB(y) are the maximum allowable proficiency level for the skill for the x and y resumes respectively, f(x) and f(y) are the proficiency level for the skill associated with the x and y resumes respectively.

* * * * *